United States Patent [19]
Chicklis et al.

[11] 3,930,158
[45] Dec. 30, 1975

[54] INFRARED PHOTOGRAPHY
[75] Inventors: Evan P. Chicklis, Nashua, N.H.;
John D. Kuppenheimer, Jr.,
Tewksbury, Mass.
[73] Assignee: Sanders Associates, Inc., Nashua, N.H.
[22] Filed: Nov. 4, 1974
[21] Appl. No.: 520,584

[52] U.S. Cl. .................. 250/330; 250/341; 354/126
[51] Int. Cl.² .......................................... H01J 31/49
[58] Field of Search ........... 250/330, 333, 338, 339,
250/340, 341, 342, 343, 495; 354/126

[56] References Cited
UNITED STATES PATENTS
3,317,730  5/1967  Hilsum ............................. 250/338
3,752,983  8/1973  Yanez ............................... 250/333
3,856,406  12/1974  Noble et al. .................. 250/343 X Primary Examiner—Davis L. Willis
Attorney, Agent, or Firm—Louis Etlinger; Richard I. Seligman

[57] ABSTRACT

Covert stop action photography is achieved by using an illuminator comprising a solid state laser which operates in the 0.8 to 0.9 micron region and which is optically pumped by incoherent energy in combination with infrared film which is sensitive in the same spectral region.

5 Claims, 4 Drawing Figures

INFRARED PHOTOGRAPHY

BACKGROUND OF THE INVENTION

Presently it is impractical to covertly photograph objects at relatively long distances under low light level conditions. In the past, covert photography has been achieved by using an incoherent source with infrared filtering and infrared film. However, because of the relatively low level of brightness from the IR filtered lamp, subjects could be photographed only at relatively short distances or at moderate distances by using large optical collecting surfaces. Gallium arsenide laser diodes have also been used in conjunction with infrared film to make covert photographs. However, GaAs emits only very low energy levels and therefore a photograph can be taken only at relatively short distances unless very long exposure times are used to average over a large number of pulses to permit adequate energy to impinge at the film plane. If these long exposure times are used, of course, the subject to be photographed must remain motionless which is very unlikely for the types of subject which would be covertly photographed. Other lasers also can be used for photography, such as ruby and YAG lasers. The ruby laser, of course, only emits in the visible range of the spectrum. YAG lasers, while covert and of high brightness, do not match the spectral region of available infrared films and therefore are unsuitable.

SUMMARY OF THE INVENTION

Accordingly, it is an object of this invention to provide improved infrared photography.

It is another object of this invention to provide an infrared photographic system including an illuminator which is relatively small, spectrally compatible with available IR film and has relatively high brightness.

It is a further object of this invention to provide a covert, stop action photographic system including a 0.85 micron laser which is optically pumped by incoherent energy.

It is yet another object of this invention to provide an infrared photography system useful at relatively long ranges with short exposure times.

Briefly, infrared photography is provided by an illuminator including a solid state laser which operates at 0.85 microns and which is optically pumped by incoherent energy, in combination with infrared film which is also sensitive at 0.85 microns. Preferably, the laser includes an erbium doped lithium yttrium fluoride (YLF$_4$) rod.

BRIEF DESCRIPTION OF THE DRAWING

The above-mentioned and other features and objects of this invention will become more apparent by reference to the following description taken in conjunction with the accompanying drawings, in which.

DESCRIPTION OF PREFERRED EMBODIMENTS

Figure 1:
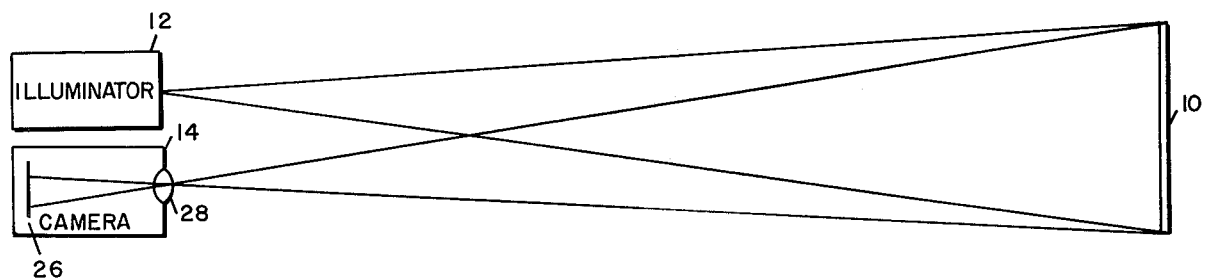
FIG. 1 is a block diagram of an infrared photographic system.
Figure 2:
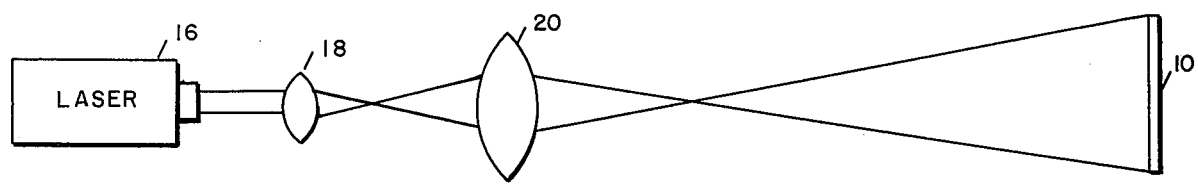
FIGS. 2 and 3 are diagrams of illuminators useful in the system of FIG. 1.
Figure 3:
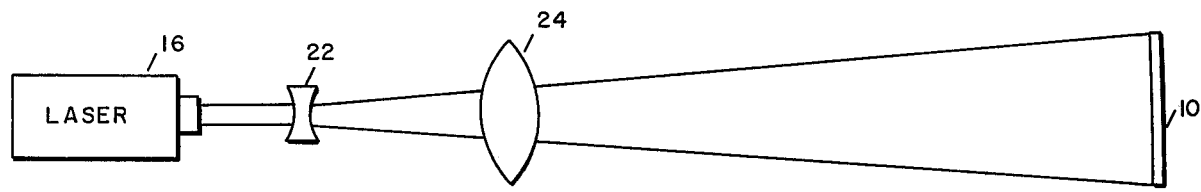

Referring now to FIG. 1, there is illustrated schematically a system for covertly photographing an object 10 at relatively long distances including an illuminator 12 and a camera 14. Typical illuminators are shown in FIGS. 2 and 3 and include a laser 16, operating in the 0.8 to 0.9 micron region, which is pumped by a flashlamp. Laser 16 preferably includes an erbium doped lithium yttrium fluoride rod ($Er^{3+}$:YLF) which exhibits efficient laser emission in the 0.85 micron region at room temperature. This region is one where available infrared films are highly sensitive. The beams from lasers 16 are made to fit the targets 10 using zoom beam expanders comprising lenses 18 and 20 in FIG. 2 and 22 and 24 in FIG. 3. In one reduction to practice of the invention, the target 10 was within a 1.83 meter circle and located at 15.24 to 45.72 meters, (50 to 150 feet) from the illuminator, that is, from lenses 20 and 24. Lenses 20 and 24 were adjusted to cover the specified field. The return energy from the target 10 was focused onto an infrared film 26 by a lens 28 of camera 14. The distance between the target 10 and lens 20 is equal to the distance between lens 28 and target 10. In a measurement of the laser energy output, laser energy was monitored and produced $60 \times 10^{-3}$ joules per flash, with only a single flash necessary to provide a good image on the film 26. If desired, the sensitivity of film 26 may be enhanced as is well known in the art.

An infrared photographic system employing currently available infrared film and an illuminator comprising a $ER^{3+}$:YLF laser provides in a small package covert-stop action photography with high resolution. The laser is compatible with the infrared film as the laser emits at 0.85 microns and the film has good sensitivity out to 0.9 microns. Because of the low beam divergence of the laser, large and expensive optics are not required for collimation.

Figure 4:
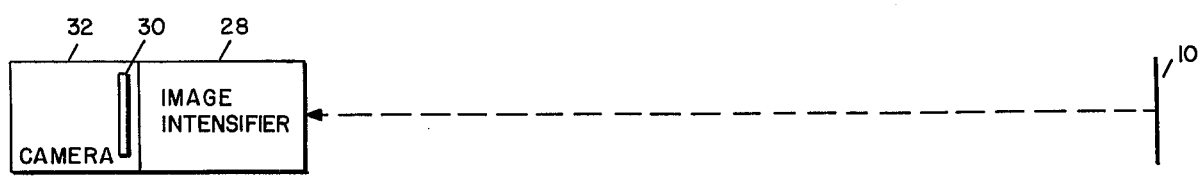
FIG. 4 is a block diagram of another infrared photographic system.

An alternative to the photography system previously discussed is an illuminator as described hereinbefore in conjunction with the apparatus shown in FIG. 4 wherein the return energy from target 10 is caused to fall on the photocathode of an image intensifier 28. The image from the phosphor screen of the image intensifier is then produced on film 30 within a camera 32. Since the image applied to film 30 is visible conventional film sensitive in the visible region is used rather than the infrared film previously employed.

While we have described above the principles of our invention in connection with specific apparatus, it is to be clearly understood that this description is made only by way of example and not as a limitation of the scope of our invention as set forth in the accompanying claims.

We claim:

1. A stop action infrared photography system, comprising:
   a camera having infrared film therein; and
   an illuminator including a solid state laser optically pumped by an incoherent source of energy and operated at a wavelength of between 0.8 to 0.9 microns.

2. The system as defined in claim 1 wherein said laser includes a rod in which the host material is lithium yttrium fluoride and the active ion erbium.

3. The system as defined in claim 1 wherein said illuminator includes a zoom beam expander.

4. A method of covertly photographing a subject, comprising the steps of:
   generating optically a pulse of incoherent energy;
   causing a laser to emit electromagnetic radiation at a wavelength of between 0.8 to 0.9 microns responsive to said generated optical pulse;

illuminating the subject with the electromagnetic radiation;
receiving electromagnetic radiation reflected from the subject; and
directing the reflected electromagnetic radiation onto infrared film.

5. A stop action infrared photography system, comprising:
an illuminator including a solid state laser optically pumped by an incoherent source of energy and operated at a wavelength of between 0.8 to 0.9 microns;
an image intensifier sensitive at the wavelength of the illuminator and disposed to receive reflected energy from a target on the photocathode thereof; and
a photographic film arranged to receive an image from the phosphor screen of said image intensifier.

* * * * *